Sept. 8, 1936.    W. T. BARKER, JR    2,053,938
GLASS LEVEL INDICATOR
Filed Jan. 7, 1932
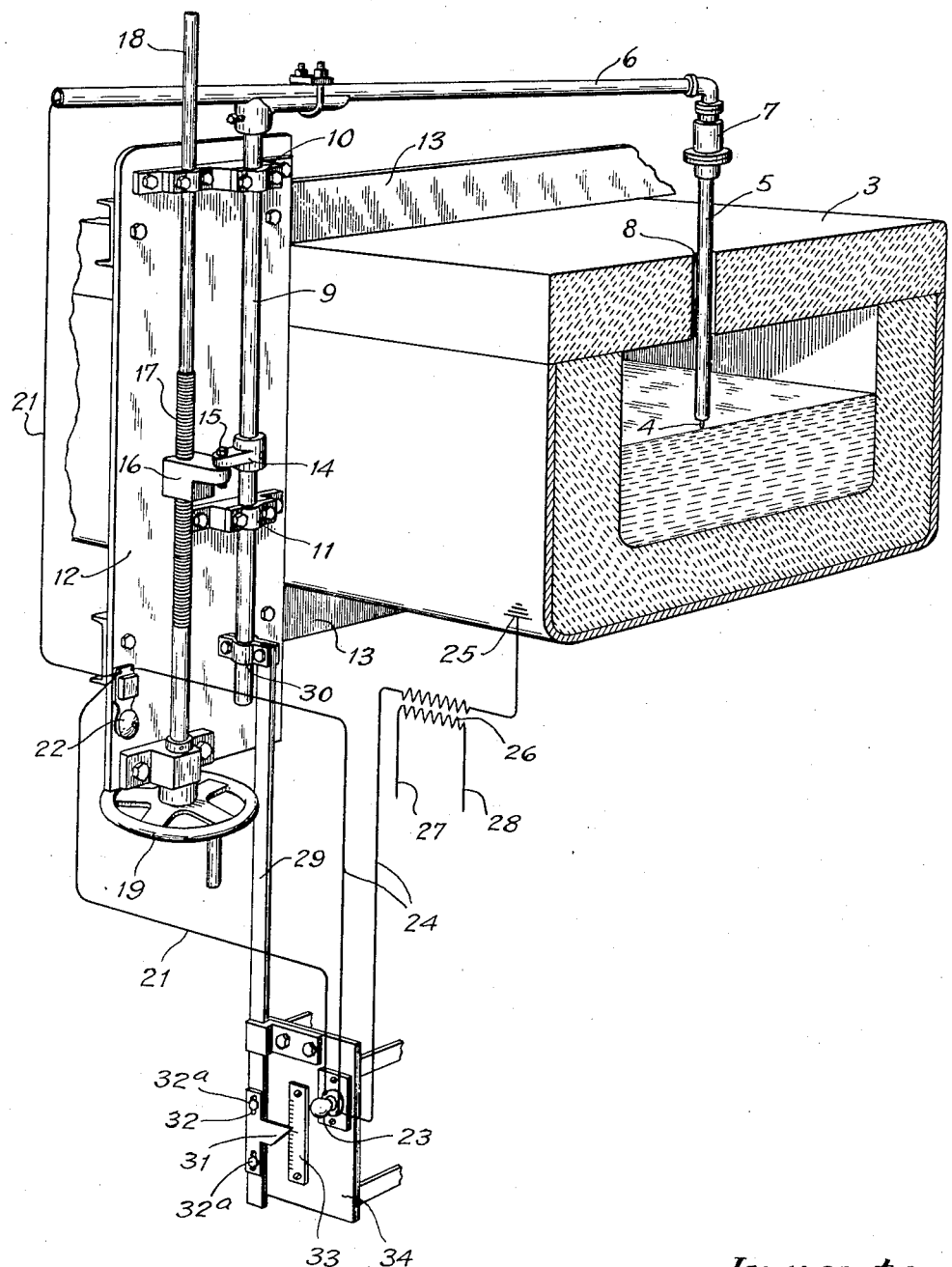
Witness:
A. A. Horn
Inventor
Wm T. Barker, Jr
by Brown & Parham
Attorneys.

Patented Sept. 8, 1936

2,053,938

UNITED STATES PATENT OFFICE 2,053,938

GLASS LEVEL INDICATOR

William T. Barker, Jr., West Hartford, Conn., assignor to Hartford-Empire Company, Hartford, Conn., a corporation of Delaware Application January 7, 1932, Serial No. 585,198

3 Claims. (Cl. 177—311)

This invention relates to a glass level indicator, and has for its general object the provision of an indicator which is simple in construction and dependable in operation.

It is very desirable as a practical matter to know the level of glass in a melting tank in order to determine whether more or less batch should be fed to the tank to raise or lower the level and thus maintain the glass line at a substantially constant height. By so regulating the level, a constant head of glass is obtained in a feeder forehearth giving a better control over the feeder operation, or in the case of suction gathering, the constant level of the glass makes frequent adjustment of the suction molds unnecessary.

Determining the level of glass in a melting tank or in a forehearth or extension thereof is difficult because of the high temperature conditions existing at the glass line. Thus it is almost impossible accurately to ascertain the level of the glass visually, as has been the usual practice heretofore, because the glass appears to merge into the refractory. Consequently, it is not unusual in practical operation for the glass level to vary as much as one inch or more.

Various arrangements and devices have been proposed for regulating the level of glass. But the corrosive action of hot molten glass is such as to make the use of many of them impractical, as for example those employing floats of refractory material. The action of the glass on such material causes it to disintegrate to greater or less extent, making level indications of the apparatus inaccurate, if not rendering the apparatus inoperative altogether in a short period of time. Other devices and arrangements have not met with favor in the practical art for one reason or another.

An object of this invention is to provide novel apparatus which is not subject to the objections to the prior practice and previously proposed devices, but which is adapted to register accurately the level of molten glass for indefinite periods of time, and at the same time is simple, practical, and convenient.

This object may be obtained by means of an electric contact device forming part of a signalling circuit, which device may be moved into and out of contact with the glass from time to time by mechanical means. The dipping of the device into the glass may serve to energize the electric circuit and effect a signal. Indicating means may be associated with the contact device whereby it may be ascertained whether or not the glass is at the desired level when the signal occurs.

The contact device preferably is of such construction and composed of such material as not to be influenced by the corrosive action of the glass, at least not sufficiently to affect the accuracy of its measurement during its use.

By the provision of such apparatus, the level of the glass in a melting tank may be maintained to within one thirty-second of an inch of the desired height, which is far greater accuracy of control than ever obtained before.

In order that the invention may be more readily understood, reference should be had to the accompanying drawing.

In said drawing,

Figure 1 is a view in perspective of apparatus of the invention associated with a glass melting tank.

The preferred form of the invention has been illustrated in Fig. 1 when associated with the forehearth 3 of a glass melting tank. It will be obvious that the invention may, however, be located at any point in or about the tank as may be desirable or convenient.

As indicated, an electric contact 4 preferably made of platinum is carried by and protrudes from a vertical porcelain tube 5, joined at its upper end to horizontal hollow rod 6. Tube 5 preferably is connected to rod 6 by means of a thermocouple head 7. Said tube is adapted to reciprocated in or through opening 8 in the top of forehearth 3.

Tube 5 and contact 4 are so reciprocated by the following means:

Rod 6 is secured to the upper end of vertical shaft 9 slidably journaled in bearings or guides 10 and 11 on panel 12 bolted to framework 13 supporting the forehearth.

Between said bearings or guides, shaft 9 has arm 14 rigidly secured thereto, the end of which is connected by pin 15 to nut 16 on the threaded portion 17 of vertically fixed shaft 18. This shaft carries a handwheel 19 on its bottom end convenient to the operative.

It will be obvious that rotation of the handwheel in one direction or the other reciprocates contact 4 toward and away from the glass.

Contact 4 forms part of an electric signalling circuit, one side of which includes line 21 leading from the contact through tube 5 and rod 6 to where it is connected first to electric bell 22 and then to a light 23. The other side of the circuit is constituted by line 24 grounded at 25 on the metallic shell of the refractory forehearth and extending to one of the windings of a transformer indicated at 26 first to light 23, then to buzzer 22.

The other winding of the transformer is suitably connected to the plant circuit by lines 27 and 28.

Thus it will be seen that when contact 4 is moved into contact with the glass, a circuit is completed through buzzer 22 and light 23 giving both audible and visual signals.

If desired, either buzzer 22 or light 23 may be omitted.

It will be understood that the buzzer and light will be so selected as to operate on low amperage current and that transformer 26 will be of such character as to supply current of such low amperage. This permits the circuit easily to be completed through the glass and the tank or forehearth at the time that contact 4 engages the glass.

At the time that the signal occurs, the glass level is indicated by the following means:

Depending from shaft 9 is rod 29 secured to said shaft by clamp 30. Rod 29 in turn carries pointer 31 having screw slots 32 by means of which it is adjustably secured to rod 29 by screws 32a. Pointer 31 rides by a scale 33 which scale is mounted on a panel 34. This panel also may carry light 23 and preferably is located so that the indicator may be easily read by the operative as he turns handwheel 19 and lowers contact 4 until it engages the glass, as indicated by the signal of light 23 or buzzer 22.

In the event that platinum contact 4 should become worn as the result of repeated dipping in the glass, such wear may be compensated by adjusting pointer 31 on rod 29 to obtain the correct reading on scale 33 when the contact touches the glass. This may be done, for example, by raising the contact clear of the opening in the forehearth, removing pin 15 which connects shaft 9 with nut 16, and swinging arm 6 to one side of the forehearth where the distance between the tips of contact 4 and pointer 31 may be measured. If necessary the pointer may then be adjusted until the distance is the same as that obtaining when the apparatus was first set up or before the contact became worn.

It will be understood, of course, that the position of scale 33 may remain fixed and that said scale preferably is graduated so as to give level readings from near the bottom of the forehearth to above the maximum level of the glass in the forehearth.

In the operation of the apparatus and after a reading is taken, tube 5 may if desired be raised by handwheel 19 until contact 4 is within the opening 8. This protects the contact from heat, gases, and molten glass. Experience has shown, however, that this is not necessary because even though the contact is raised only slightly above the glass, it is prevented from deteriorating by a thin glaze or coating of glass which remains thereon and protects it from the corrosive action of gases and from heat.

The contact is moved toward and away from the glass, and level readings taken as often as may be desirable.

Having thus described my invention, what I desire to claim and secure by Letters Patent is:

1. In combination with an enclosed container for molten glass having a vertical opening in the cover thereof, the wall of said container comprising refractory material apparatus for determining the level of glass in said container comprising a contact device composed of a non-corrodible contact member mounted in a porcelain protective tube, a horizontal arm supporting said device in vertical position for movement through the opening in said cover toward and away from the surface of the glass, a vertical rod carrying said arm, means for supporting said rod for reciprocation, a vertically fixed screw-threaded shaft having a nut thereon, means for connecting the nut to the vertical rod, a handwheel for turning said shaft to cause the contact member to be moved into and out of contact with the glass, an electric circuit including said contact member, means for grounding a part of said circuit on the container, means for supplying current to said circuit whereby a circuit may be completed through the refractory wall of said container, a signal device in said circuit, an indicator connected to said rod, and means for shifting the indicator relative to said rod, to maintain a predetermined vertical distance between said indicator and said contact member.

2. In combination with a container of molten glass having an opening therein, electrical apparatus for determining and measuring the level of molten glass in said container comprising a rigid supporting member, said member comprising a vertical shaft mounted for rotation and reciprocation in guides at one side of said container, a horizontal rod carried by said shaft, and a refractory insulating tube depending from said rod, contact means resistant to molten glass mounted in said tube, an electric signalling circuit including means connected to said contact means adapted to cause a signal when said contact means contacts with the molten glass, means for reciprocating said rigid member to move said contact means into and out of contact with the molten glass, and means for indicating the level of glass in said container upon the occurrence of a signal.

3. In combination with a container of molten glass having an opening therein, electrical apparatus for determining and measuring the level of molten glass in said container comprising a rigid supporting member, said member comprising a vertical shaft mounted for rotation and reciprocation in guides at one side of said container, a horizontal rod carried by said shaft and a refractory insulating tube depending from said rod, contact means resistant to molten glass mounted in said tube, an electric signaling circuit, including means connected to said contact means adapted to cause a signal when said contact means contacts with the molten glass, means for reciprocating said rigid member to move said contact means into and out of contact with the molten glass, and adjustable means responsive to the movement of said member for indicating the level of glass in said container upon the occurrence of a signal, means for disconnecting the rigid member and the means for reciprocating said member whereby said member may be swung to one side of the container for adjusting said indicating means with respect to the contact means.

WILLIAM T. BARKER, Jr.